United States Patent
Foodman et al.

(10) Patent No.: US 6,975,220 B1
(45) Date of Patent: Dec. 13, 2005

(54) INTERNET BASED SECURITY, FIRE AND EMERGENCY IDENTIFICATION AND COMMUNICATION SYSTEM

(75) Inventors: Bruce A. Foodman, Redding, CT (US); Harold W. Foodman, Westport, CT (US)

(73) Assignee: Radia Technologies Corporation, New Haven, CT (US)

(*) Notice: Subject to any disclaimer, the term of this patent is extended or adjusted under 35 U.S.C. 154(b) by 0 days.

(21) Appl. No.: 09/545,948

(22) Filed: Apr. 10, 2000

(51) Int. Cl.[7] .................................................. G08B 1/00
(52) U.S. Cl. ................... 340/531; 340/506; 340/539.25
(58) Field of Search ................... 340/506, 517, 340/521, 531, 532, 539.25, 541, 3.1

(56) References Cited

U.S. PATENT DOCUMENTS

| | | | | |
|---|---|---|---|---|
| 5,086,385 A | * | 2/1992 | Launey et al. | 700/83 |
| 5,400,246 A | * | 3/1995 | Wilson et al. | 700/17 |
| 5,917,405 A | * | 6/1999 | Joao | 340/426.17 |

OTHER PUBLICATIONS

"Electronic Security Market Analysis", *Security Industry Market Overview: 1999–2000*, pp. 13–33; 59–61; and 67–71.

R. Chase, Security Ind. Market Overview 99'–00, Published 1999 in the USA.

STAT Resources, Security Ind. Desk Ref. 1997, Published 1997 in the USA.

* cited by examiner

*Primary Examiner*—Daryl Pope
(74) *Attorney, Agent, or Firm*—Barry W. Chapin, Esq.; Chapin & Huang, LLC; Marc Foodman, Esq.

(57) ABSTRACT

The present invention provides a system for detecting an event within a premises and providing data such as live or recorded video and audio regarding that event to a web site. The event may be an unauthorized entry to the premises, a fire, or a maintenance malfunction within the premises. The web site may be accessed by a variety of authorized users including the owner or manager of the premises, a central monitor, local police, fire, or emergency medical personnel, or other entities specified by the owner or manager of the premises. The system permits authorized users to view the event in real time or as recorded on the web site after the event has occurred to determine the type of event and an appropriate course of action to rectify it.

28 Claims, 4 Drawing Sheets

INTERNET BASED SECURITY, FIRE AND EMERGENCY IDENTIFICATION AND COMMUNICATION SYSTEM

The present invention relates to a method and apparatus for providing automatic, real-time or recorded, transmission of voice, data and video images from a premises to a single party or multiple interested parties using an internet website as a communications conduit. The website may be accessed only by interested parties that have been properly authorized. Access is made after an event has occurred comprising an intrusion, a fire and/or another type of emergency or other event at a premises.

BACKGROUND INFORMATION

Systems for detecting and reporting intrusions and other types of events including but not limited to fire and medical emergencies are well known in the prior art. A typical system for securing and protecting the occupants of a premises, such as a home or an office building for example, includes: 1) at least one keypad/display panel; 2) a central system controller; 3) entry point sensors located at various windows and doors to the premises; 4) sensors for detecting movement, vibration or sounds within the premises in the event that the entry point sensors have been evaded; 5) sensors for detecting fire and/or smoke or other functions within or outside a premises including temperature or low heating fuel; 6) an audible and/or visual alarm and 7) a telephone line connection.

The keypad/display panel is a device through which the security system is activated or deactivated by an authorized user of the premises. The keypad/display panel can incorporate a "panic switch(es)" to allow a user to immediately signal an emergency such as an intruder, fire or medical problem without the central controller being in the alarm state. Once the system has been activated using the keypad to enter an activation code, or through a key or some other form of proper activation, a signal is sent from the keypad/display panel to the central controller. The central controller continually monitors each of the entry point sensors connected through electrical wiring or other form of communication (i.e. radio frequency ("RF")) to the central controller within the premises. In the event that a window or door is opened while the system is activated, the particular entry point sensor detects the entry and signals the central controller. Alternatively, if an intruder enters the premises without tripping one of the entry point sensors, one of the motion or other types of sensors may detect the intruder and alert the central controller that an intruder has been detected within the premises. A motion or sound sensor may be triggered without an entry point sensor detecting an open event.

Once the central controller receives a signal from an entry point sensor or other type of sensor it may sound an alarm. Alternatively, or in addition to the alarm, if the premises is being monitored by a remote monitoring entity, the central controller will dial a telephone number of the remote monitoring entity to provide notification of an intrusion or other form of emergency event and provide data regarding the event. The remote monitoring entity must then attempt to ascertain the exact nature of the event and whether the alarm is a "false alarm." In situations where the remote monitoring entity cannot determine the exact nature of the alarm indication they may send a guard to the premises and/or notify local police, fire or emergency medical providers of the alarm indication who may be dispatched to the premises to investigate.

The primary problem with prior art security and emergency notification systems of the type described above relates to the inability of the remote monitoring entity to accurately verify an alarm indication. Therefore, there are frequently false alarms that may be caused by any number of events, including but not limited to: 1) a faulty sensor; 2) a pet moving within the premises; 3) an authorized entrant that has mistakenly tripped a sensor unknowingly; 4) an authorized entrant that has failed to deactivate the system; 5) smoke from a stove or fireplace; or 6) a child at a premises who has inadvertently requested emergency medical assistance by depressing the emergency sequence on the keypad/display. Any one of these false alarm indications will cause the alarm to be sounded and the remote monitoring entity to be immediately notified. Frequent false alarms cause neighbors to believe that alarm indications are "false". More importantly, a high number of false alarms cause police, fire and emergency services providers to react slowly believing the subject alarm indication to be false.

Another problem with these types of prior art systems is that information transmitted to the remote monitoring entity only relates to how an alarm indication was activated (i.e. through the activation and control panel or through a sensor). Thus, if an actual emergency has occurred, the remote monitoring entity has no means of identifying what a perpetrator looks like, the location of a fire at the premises or the condition of person who has suffered a medical emergency. Furthermore, systems of these types do not provide real time information to emergency services providers which can be transmitted to multiple interested parties at diverse and remote locations. Nor, do these systems provide immediate notification of an alarm indication to a premises owner or manager who is not at the premises at the time of the alarm.

A second type of security system that is well known in the prior art is a Closed Circuit Television System (CCTV). CCTV Systems utilize video surveillance cameras that are placed at various points within or near a premises. CCTV Systems are "closed" systems and provide authorized parties with the capability to view events, which are or have taken place at a premises in three ways: 1) A monitoring station located at the premises can be equipped with video monitors and other equipment that enables an individual or group of individuals to view the input from the various cameras connected to the System in real time. Systems that permit on-premises monitoring may also be equipped with the capability to record events over some time period using tape or digital recording devices. Recording can be reviewed by interested parties at a later date; 2) CCTV Systems can be equipped with recording devices only, thus precluding real-time monitoring but providing the capability to view recorded events at a later date; 3) CCTV Systems can be installed at several remote locations with the input from the various cameras being transmitted to a single centrally located video monitoring site equipped with apparatus that permits viewing and/or recording of events from all of the remote locations.

CCTV systems suffer from numerous problems: 1) they are not practical for use at residences or small businesses since continual recording of living and work environments is generally considered to be intrusive; 2) CCTV Systems require constant monitoring of transmitted video images in order to be effective in the prevention of crime, or early detection of an emergency. Such a requirement necessitates expensive personnel who can provide monitoring services; 3) CCTV Systems do not possess the capability to automatically alert an off site premises owner or manager of an emergency condition at the premises; 4) CCTV Systems do not enable real time, secure viewing of video images by multiple interested parties, including emergency services providers who are located away from the premises but who have a temporary or recurring interest in the events transpiring at the premises; 5) CCTV Systems do not enable real time voice communication between multiple interested parties, including emergency services providers who are located away from the premises but who have a temporary or recurring interest in the events transpiring at the premises; 6) CCTV Systems provide information as an emergency event unfolds, but generally cannot provide early warning for such emergencies as fires or unauthorized intrusions unless constantly monitored.

A third type of security system that is well known in the prior art is an "interactive video surveillance" or "remote alarm verification and video surveillance system". These systems utilize all of the components of a standard security and emergency notification system, but in addition incorporate the use of: 1) a video controller board; 2) the components of a CCTV System; and 3) a speaker phone tied to the central system controller.

Interactive Video Surveillance or Remote Alarm Verification and Video Surveillance Systems (IVSS) provide the capability for automatic, real-time transmission of voice, data and video images from a premises to a single interested party using conventional telephone lines. IVS provides the capability for: 1) a central station operator to visually verify the nature of an alarm event at a premises following an alarm event; 2) a central station operator to engage occupants of a premises in real-time voice communication following an alarm event; and 3) permit a single interested party to "dial into" a premises in order to carry out remote video surveillance when an alarm event has not been triggered.

IVSS suffer from numerous problems: 1) IVSS can transmit voice, data and video images to only one remote location at a time; 2) IVSS rely on low paid central station monitoring operators to control emergency conditions; 3) IVSS is not secure due to the capability for an interested party to "dial into" a system to view video images from a remote location; and 4) IVSS systems in their present form are limited to communications using conventional telephone lines.

Due to the drawbacks of the foregoing systems, an improved security system is needed. Such a system will provide system capabilities and functionality which: 1) provides automatic notification to multiple interested parties of an alarm event at a premises; 2) enables the transmission of voice, data and video images between multiple remote locations simultaneously; 3) provides security by precluding a party from "dialing into a premises" to view real-time video images; 4) provides the ability for system parameters to be reviewed and activated from remote locations; and 5) permits the use of wireless devices for; (i) sending and receiving information regarding an alarm event, (ii) reviewing system parameters and activating a system from remote locations, and (iii) communicating with other interested parties who are sending and receiving information following an alarm event.

SUMMARY OF THE INVENTION

The present invention offers a solution to the problems of the prior art by offering a system and method that incorporates the elements of the prior art systems, while adding and enhancing functions, and providing new and unique methods for the premises owner (or manager), emergency services, the central monitoring station and other authorized users to communicate as a group to monitor the system. The subject invention overcomes the shortcomings of the prior art systems by providing a practical and cost effective means for combining video monitoring, two way voice, and data communications to a central monitoring station via a proprietary website.

The use of a website enables the authorized users to simultaneously view the video data transmitted from the site while maintaining group voice and data contact regardless of their current location. In particular, video cameras are strategically located within a protected premises to record activity at various entry points or in other central passageways throughout the premises. Additional video cameras can be added at other locations as desired for specific monitoring functions such as at or near storage locations for valuables. Sensors within the premises may detect a variety of events, including: 1) security breach, 2) fire, 3) smoke, 4) panic, or 5) maintenance. Once an event is detected while the system security and video controllers have been activated, the following events occur: 1) the video controller activates the camera and associated lamp monitoring the tripped sensor; 2) the security system controller begins the process of transmitting data to the central monitoring station; and 3) the transmission signal from the system controller to the central monitoring station is intercepted by the video controller that initiates communications to the website.

Communications to the website is by one of the following internet compliant communications means: standard phone line, broad band bi-directional cable connection, digital subscriber line ("DSL"), wireless phone service or any other internet compliant communication format. Once the website connection has been made, the security system transmits data to the website indicating the premises' account number. The website database is accessed to determine the central monitoring station that services the identified account. The website then routes the video, data and voice channel outputs from the activated site to the central monitoring station. The web site simultaneously places a call to the premises owner or manager (referred to collectively as "owner") to notify them of the system alarm condition.

Once the owner and the monitoring station are on line to the web site they may communicate by voice channel while simultaneously viewing video and sensor data from the site. If an emergency exists, emergency services providers such as police, fire, medical or maintenance services personnel are notified. They can connect to the website to access voice and data channel connections as well as being able to see the cause of the problem through the viewing or reviewing of the video signal being recorded at the premises. In a preferred embodiment of the present invention, a remote monitor that is notified and gains access to the website may be any one of a number of individuals or entities. For example, they may include: 1) the facility owner's web compliant pager; 2) the facility owner's web compliant cellular telephone; 3) a computer site designated by the facility owner; 4) a remote central monitoring site; 5) the local police department; 6) the local fire department; or 7) any other authorized entity designated by the facility owner. The alerted party is provided with an internet web page address to view the video data that is being posted to that website. For security purposes, each user may be required to enter an access code to gain entrance to the website. The alerted party can determine whether there is an actual emergency by examining the real time video and audio data or recorded data from the site thereby eliminating, or at least greatly reducing, false alarms and nuisance calls.

It is an object of the present invention to provide a security system and method that provides imaging of an event to confirm the identity of the intruder, or that the intruder is an authorized entrant.

It is another object of the present invention to provide real time video and audio, and recorded data of an event to be posted to an internet website for access by an authorized user for viewing, review and to determine an appropriate course of action to handle the event.

It is another object of the present invention to eliminate or reduce false alarms and nuisance security calls.

DETAILED DESCRIPTION OF THE PREFERRED EMBODIMENTS

Figure 1:
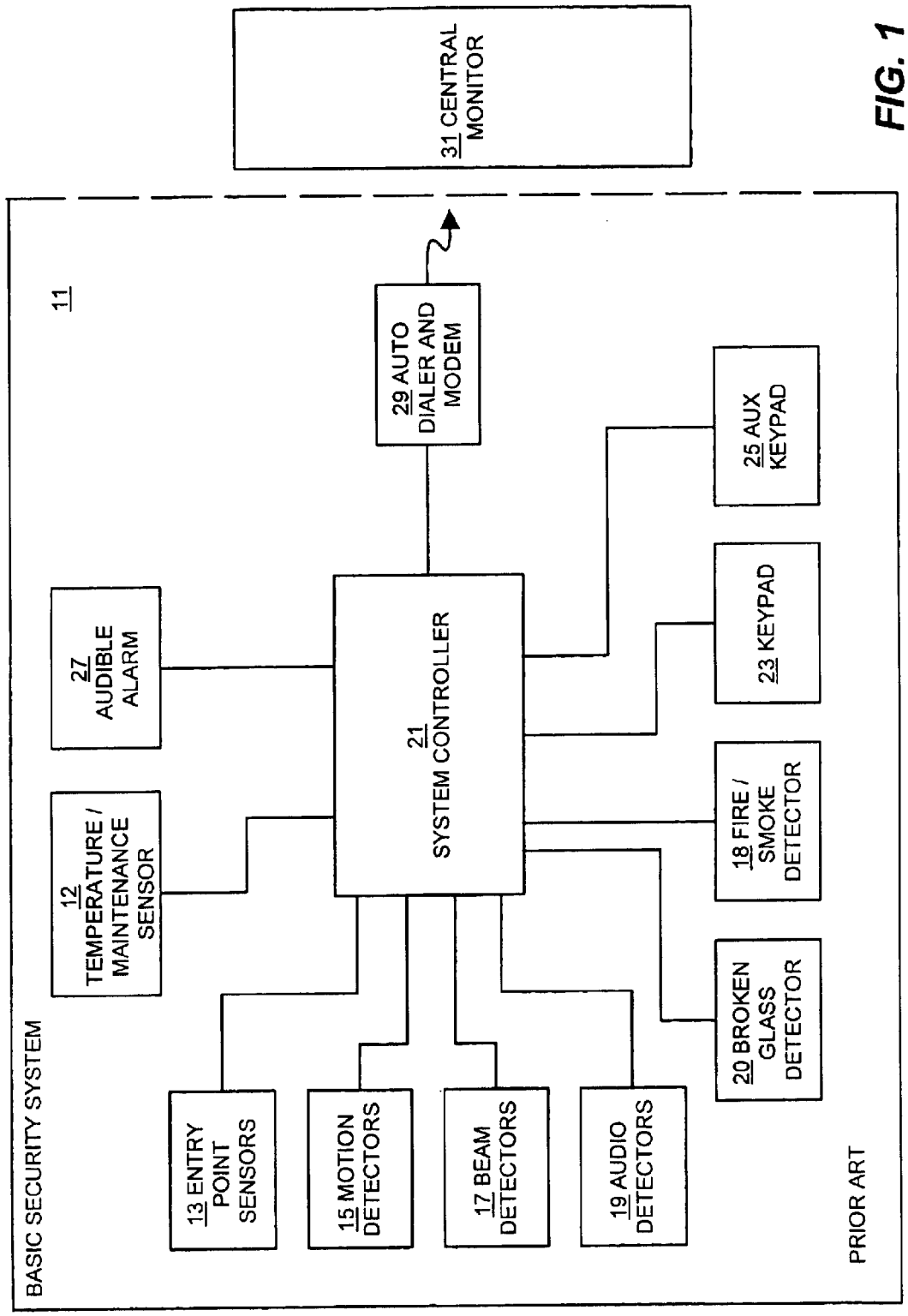
FIG. 1 is a prior art security system using various sensors.

The present invention relates to security systems and methods, and more particularly, to security systems and methods using local video surveillance combined with transmission of recorded data such as video or audio sequences to an internet website from the secured premises. Throughout the drawings, like reference numerals are used to identify particular elements of the described systems and methods.

FIG. 1 is a block diagram of a prior art basic security system 11 for home or commercial use. Basic security system 11 includes temperature or other maintenance function (i.e. low heating fuel) sensors 12 and entry point sensors 13 that may be in the form of switches for detecting an open event at an entry point such as a door or a window. Basic system 11 may also include motion sensors 15 for detecting movement within the protected premises in the event that an entry point sensor is bypassed without being activated. In addition or as an alternative to motion sensors 15 are beam detectors that are activated by movement through the sensors path. Beam sensors 17 are typically located in doorways, hallways or other passageways where a beam can be transmitted and received across a relatively narrow area. Finally, basic system 11 may include fire/smoke detector 18, audio detectors 19 for detecting noise generated by an intruder such as the breaking of glass or some other audible sound, and/or broken glass detector 20.

Each of sensors/detectors 12, 13, 15, 17, 18, 19, 20 is connected to system controller 21. Controller 21 is normally a microprocessor-based device that is programmed to monitor input lines connected to sensors/detectors 12 13, 15, 17, 18, 19, 20. Other inputs to controller 21 include a keypad/display 23 through which a user may activate, deactivate or issue other commands to basic system 11. An auxiliary keypad 25 is optional and may allow a user to activate, deactivate or issue other commands to basic system 11 from a location separate from keypad 23. For example, main keypad 23 may be near an entry to the premises while auxiliary keypad 25 may be located in a master bedroom. It should be understood that keypad/displays 23, 25 may be replaced with numerous alternative activation and deactivation devices. These devices may include, but not be limited to a keyswitch, an electronic or magnetic stripe card and reader, a finger print imaging device, or other well known security activation/deactivation devices for ensuring that access is limited to authorized users.

Basic system 11 can be operated in local mode or central monitoring mode. In local mode, basic system 11 utilizes an audible alarm 27 to alert the user or premises owner that an intrusion has been detected. In central monitoring mode, basic system 11 may utilize audible alarm 27, but more importantly, an auto dialer and modem 29 is activated to notify a central monitor that an intrusion has occurred.

In operation, a user activates basic system 11 by inputting an activation signal on keypad 23 or auxiliary keypad 25. Once basic system 11 has been activated, system controller 21 continuously monitors the activity of sensors 12, 13, 15, 17, 18, 19, 20. In the event that an intrusion is detected at any of these devices, system controller 21 turns on audible alarm 27 and/or notifies central monitor 31 through auto dialer and modem 29. The user can deactivate basic system 11 at any time by inputting a deactivation signal on keypad 23 or auxiliary keypad 25. In addition, a panic signal may be input to keypads 23, 25 to set off alarm 27 and contact central monitor 31 in the case of an emergency even if system 11 has not been activated.

Figure 2:
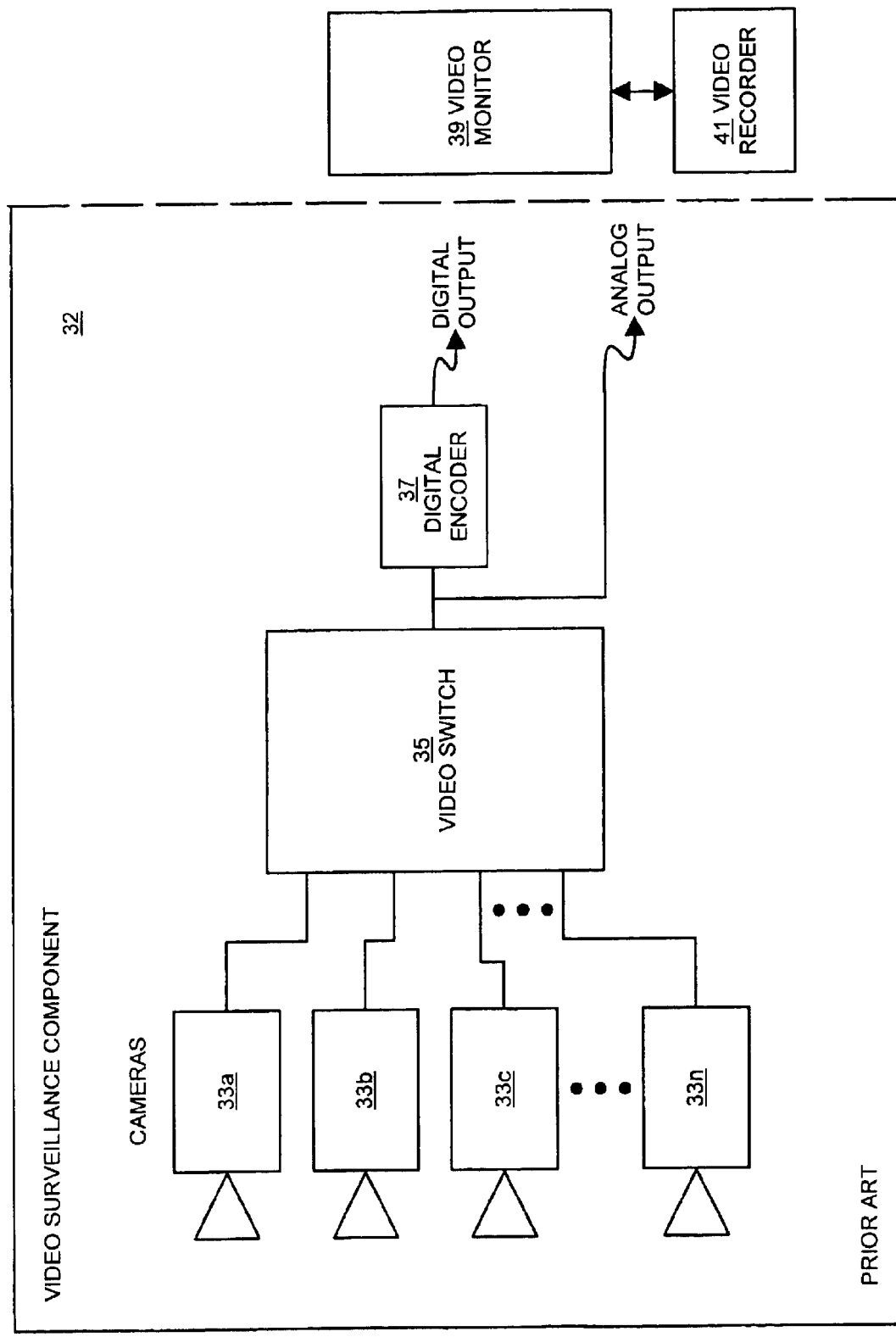
FIG. 2 is a prior art security system using video surveillance.
Figure 3:
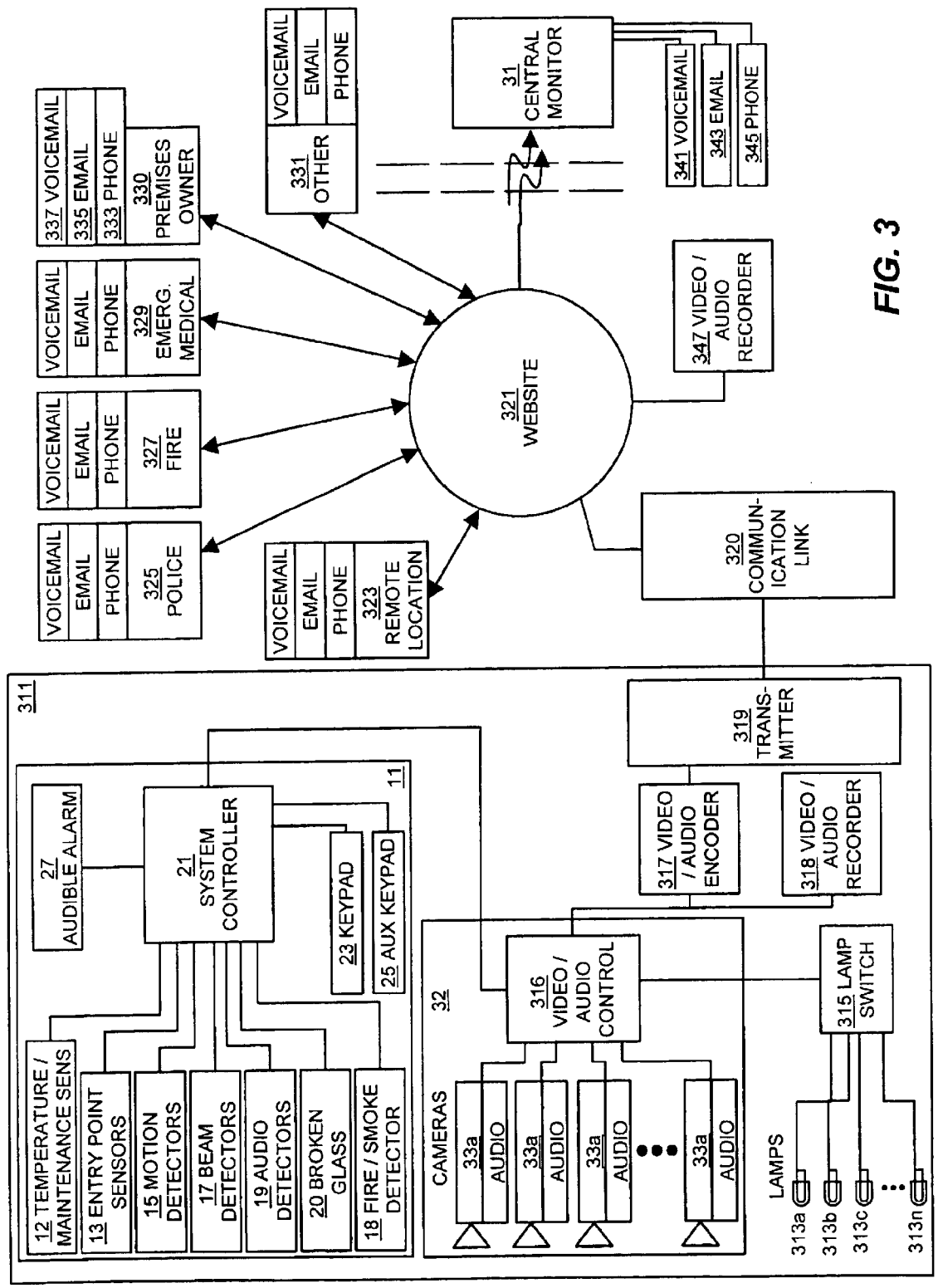
FIG. 3 are block diagrams of the security system of the present invention.

FIG. 2 is a block diagram of a prior art video surveillance system 32 that may be used by itself or in conjunction with the basic security system 11 for home or commercial use. A set of cameras 33a–n are positioned throughout a premises for performing video surveillance. Each camera 33a–n is connected to a video switch 35 that permits security personnel to switch between the video signals transmitted from each of cameras 33a–n. A digital encoder 37 may be used to encode the video signal from the selected camera before it is transmitted to a video monitor 39 that is reviewed by the security personnel. The system may also use the analog signals from video switch 35 to directly drive the video monitor 39 if it is an analog type unit. The video signal from the digital encoder 37 or the video switch 35 can be recorded by a video recorder 41 to preserve the video transmissions from cameras 33a–n for future viewing and review. The video transmissions allow the security personnel to actually remotely view the premises to determine the cause of an intrusion signal sent by a sensor or detector of basic system 11. Even if a security system 11 is not in use, cameras 33a–n may be used to display an image on a monitor in real time or by review of recorded data from video recorder 41 for events that occur at the protected premises FIG. 3 is a block diagram of a security system 311 of the present invention. Security system 311 contains some of the same components of basic security system 11. In addition, security system 311 contains some of the same components of video surveillance component 32. In security system 311 of the present invention, sensors 12, 13, 15, 17, 18, 19, 20 operate in the same manner as described above with respect to basic security system 11, except that they include an identification code for specifying which sensor has been tripped. For at least some of sensors 12, 13, 15, 17, 18, 19, 20 and preferably for each of the sensors, a surveillance camera 33a–n covers the area around a particular sensor or sensors. For each camera 33a–n, a corresponding lamp 313a–n is located proximate thereto to illuminate the area under surveillance by a particular camera. Data, voice and audio signals are captured or imaged by cameras 33a–n that are each equipped with a microphone and a speaker indicated at each camera as an audio subblock. The microphone and speaker permit two way communication between each camera 33 and website 321. The data, voice and audio signals are transmitted and received using available technology from a number of sources, including Axis, Inc.

Lamps 313a–n are controlled by a lamp switch 315 to select the appropriate lamp for illuminating an area covered by a corresponding selected camera 33a–n. A video controller 316 is used as in basic security system 11 for the purpose of switching between the different cameras 33a–n. A video encoder 317 receives the video output signal of a camera and prepares the video signal for transmission by transmitter 319. Transmitter 319 uses a communication standard such as MPEG or JPEG for transmission of the data, voice, and video information from system 311. An alternative proprietary compression and communication standard may be used for signal transmission from system 311. The communication standard used for data transmission from system 311 by communication link 320 will depend on the type of data link between system 311 and website 321. Examples of different standards are broadband bi-directional cable, a digital subscriber line ("DSL"), phone line, radio frequency ("RF") link, ISDN, cell phone link, or any other internet compliant communication standard or "data format."

A website 321 is used to post the data transmission so that it may be viewed and evaluated on website 321. Website 321 may be accessed by a variety of authorized viewers including but not limited to the premises owner from any remote location 323, a police department 325, a fire department 327, an emergency medical service 329, the premises owner 339 from a permanent designated site, or any other entity 331 authorized by the user of security system 311. Additionally, website 321 may transmit other types of signals such as a message to be left on the owner's/manager's designated voicemail box 333 or an email message to be sent to a user's designated email address 335. The website 321 may also call a designated phone 337 to notify the owner of an event either by making live contact or sending a page message.

In operation, a user activates security system 311 through keypad/display 23 or auxiliary keypad/display 25. As with basic security system 11, activation occurs when the user depresses a series of keys that typically represent a code selected by the user and programmed into the system. As with the prior art systems, many other activation/deactivation systems may be employed. The same code is typically used to de-activate the system by depressing the series of keys while security system 311 is in its active state. Other codes entered on either keypad/display 23, 25 may be used for immediately enabling audible alarm 27, and connecting to web site 321 if the user is in a panic situation. Once activated, system controller 21 continuously polls temperature/maintenance sensor 12, entry point sensors 13, motion detectors 15, beam detectors 17, fire/smoke detector 18, audio detectors 19, and broken glass detector 20. If an intrusion or emergency is detected at any of these sensors 12, 13, 15, 17, 18, 19, 20, video controller 21 transmits a signal to video/audio controller 316 to turn on the particular camera 33a–n and lamp 313a–n respectively covering the tripped sensor/detector.

The particular camera begins shooting to "capture" or "image" events occurring in the area it covers while the corresponding lamp illuminates the covered area in the event that it is dark. Video controller 316 passes the video signal from the active camera to video/audio encoder 317. Video/audio encoder 317 encodes video signals in a selected data format. At the same time, the video/audio signals are transmitted by controller 316 to video/audio recorder 318 for recording and playback at a later time. If it is desired to record the video/audio signals, recorder 318 may receive signals from encoder 317 as an alternative to receiving the signal directly from controller 316.

Encoder 317 passes the encoded video/audio signal to transmitter 319 in the data format for transmission to website 321. Transmitter 319 is typically a DSL modem, manufactured by Cabletron, Inc. of Manchester, N.H. Since keypad/display panel 23, 25, or a sensor 12, 13, 15, 17, 18, 19, 20 has already activated the system controller 21, controller 21 has opened the two way combined data, audio and video channel to website 321 through transmitter 319 and communications link 320. Communications link 320 connects system 311 to website 321.

It is also possible for an authorized entity to perform a variety of functions on system 311 by accessing system 311 through website 321. Examples of such functions are activating or deactivation system 311, checking the status of system 311, checking the status of a particular sensor to determine temperature at temperature sensor 12, fuel level at a fuel level sensor (not shown), or other functions such as a history of past events that may be stored and accessed by system controller 21.

Figure 4:
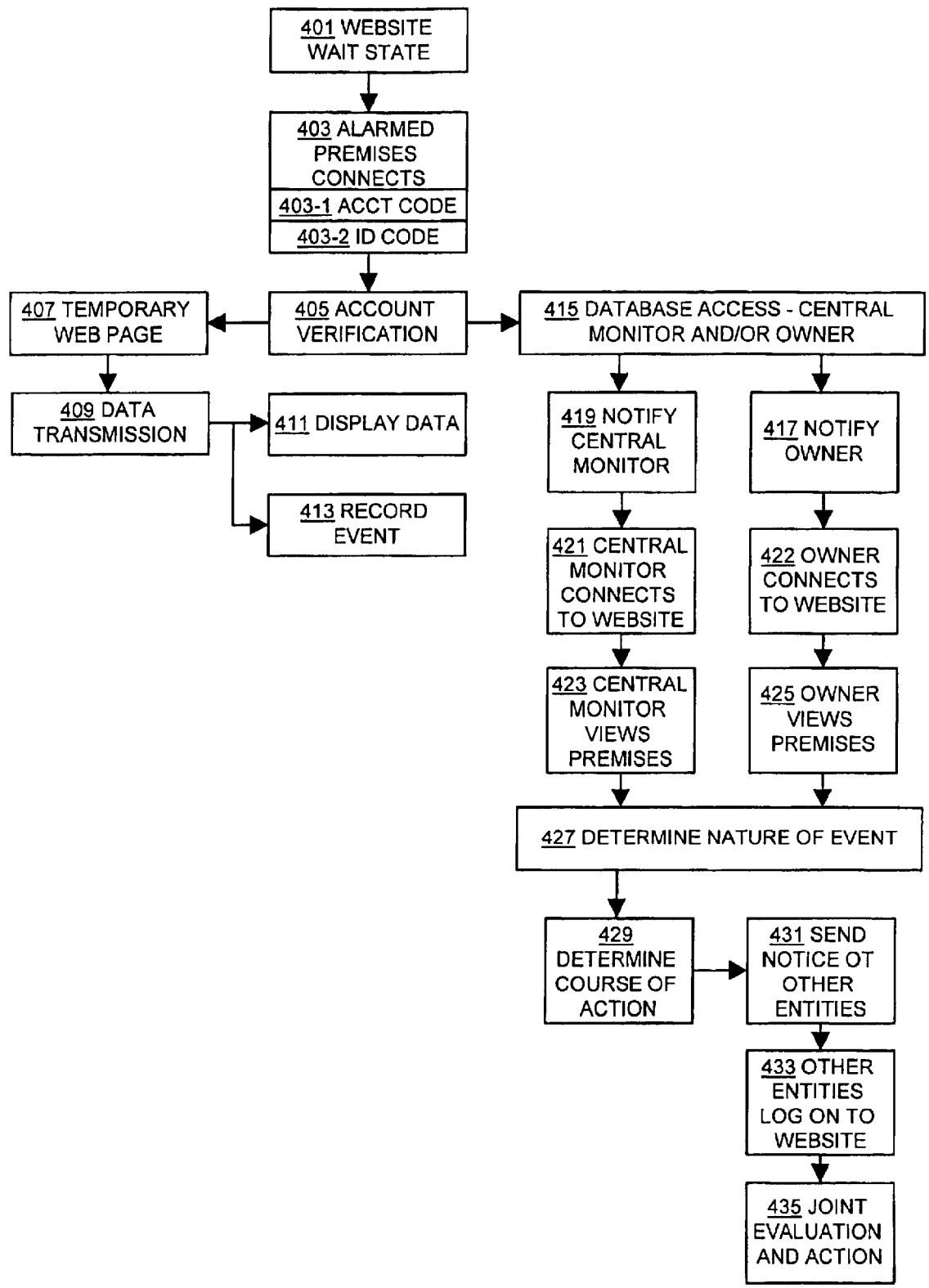
FIG. 4 is a flow chart that shows a sequence of steps executed during in the operation of the security system of the present invention.

FIG. 4 is a flow chart illustrating the sequence of events that occur in a preferred operation of the system of the present invention. First, website 321 is in a wait state 401 awaiting an input from the alarmed premises. When website 321 receives a connect input 403 from system 311, an account code 403-1 for system 311, identifying the particular premises is provided. In addition, an identification code 403-2, identifying tripped sensors 12, 13, 15, 17, 18, 19, 20 is provided to inform the website of the particular sensor/camera pair that has been tripped. Website 321 uses the provided account code to verify within its database of existing customers that the connected premises is an active account. Upon proper verification, a temporary event webpage is created 407 specific to the account and the event that has occurred for the premises that has connected to website 321. At this point, website 321 is ready to receive video/audio data transmitted by connected system 311. The event being imaged by system 311 is displayed on website 321 for review 411 along with the identification code of the camera/sensor pair transmitting the data related to the event. At the same time, the information provided by system 311 is recorded 413 by recorder 347 for later playback and for archival purposes.

The account information received from system 311 by website 321 for verification 405 is also used to determine the proper central monitor 31 in its database that services the account 415. Along with central monitor information, website 321 may access owner information 417 and transmit a signal to alert the owner 330 via voicemail 333, e-mail 335, or phone 337. The central monitor 31 is alerted to the event 419 and notified of the temporary website established for this event 407 along with the account number, the event number and the camera/sensor identification code. The signal transmitted to the owner 417 contains the same pertinent information as the signal transmitted 419 to central monitor 31. Both central monitor 31 and owner 330 are able to access the temporary webpage 407, 422 simultaneously. Central monitor 31 views video images and listens to audio signals 423. Two-way communication is enabled using the selected data format to allow central monitor 31 to converse with individuals at the premises. Depending on the owner's location, they may also have the same capabilities 425 via links 323, 330, or possibly more limited capabilities such as audio only through a telephone.

After central monitor 31 and/or owner 330 view real time video images, recorded video images and engages in conversation with individuals at the alarmed premises, a determination can be made as to the nature of the event 427 that has caused the alarm. If the event is not an emergency and does not require any action, central monitor 31 and/or owner 330 can make that determination and log out of temporary webpage 407 closing out activity for that event. If the event requires further action, the revealed cause of the alarm permits central monitor 31, with assistance from owner 330 (or alone if owner is unavailable), to determine an appropriate course of action to handle the alarm event 429. It should be understood that there are numerous ways to notify entities that may access website 321. For example, rather than website 321 sending signals directly to owner 330 at step 417, central monitor 31 may be the primary party that is notified and notification of all other entities may be the responsibility of central monitor 31.

As discussed with respect to FIG. 3, each camera 33*a–n* includes a speaker and microphone pair indicated by the incorporated audio block that can be used to communicate between system 311 and website 321 for access and use by central monitor 31 and/or the premises owner through link 330. After evaluation of the transmitted information 429, if an emergency exists, central monitor 31 and/or the owner can take action to cause website 321 to provide notification 431 to any of the following: 1) a remote location 323 (designated by the owner); 2) police 325; 3) fire department 329; 4) emergency medical personnel 329; or 5) other authorized users 331. Notification is achieved by sending a voicemail message 341, email message 343, or a direct phone call 345 as illustrated by step 431. Alternatively, the central monitor 31 may initiate a voicemail, phone call, or email to any of the aforementioned authorized access entities 323, 325, 327, 329, 331 via the website. The authorized entities 323, 325, 327, 329, 331 access website 321 and view the combined data, voice and video information in real time (or as recorded earlier) simultaneously with central monitor 31 and/or owner 330 to evaluate the event 433. The various entities can act cooperatively to determine the appropriate type of equipment they may need to send to the premises in an emergency situation or act as otherwise required 435.

Through the use of website 321, individuals and services 323, 325, 327, 329, 330, 331, 339 and central monitor 31 will be able to access system 311, when authorization has been approved, to perform functions such as: 1) turning on the alarm system 311 when the owner or manager has inadvertently forgotten to do so upon leaving the premises; or 2) obtaining system reports for access, maintenance, and other functions. System 311 will not customarily allow an outside source to turn on the cameras 33*a–n*. This function will have a hardware settable option in system controller 21 to override the default condition and allow authorized access through the website 321 to turn on the video cameras if the premises owner or manager approves.

Although the invention has been described by way of a preferred embodiment, variations or modifications can also be used with the invention. For example, the maintenance sensor has been described with respect to monitoring the ambient temperature of the premises. It is also possible to include a sensor that is capable of detecting the presence of water in a basement or other area of the premises. In addition, the order and method of notification to the various entities can be configured in many ways. The scope of the invention is therefore defined by the following claims:

What is claimed is:

1. A system for detecting an event in a premises and transmitting data regarding the event, comprising:
   at least one sensor for detecting the event;
   a controller coupled to the at least one sensor for receiving a signal from the at least one sensor indicating that an event has been detected;
   at least one imaging device coupled to the system controller for capturing event data associated with the event detected at a particular at least one sensor wherein the imaging device is activated by the controller upon receiving the signal from the particular sensor that is in an area covered by a particular imaging device;
   a transmitter coupled to the imaging device and the controller for transmitting the event data captured by the imaging device upon receiving a transmission activation signal from the controller after detection of the event; and
   a website for receiving the event data from the transmitter and making the event data accessible for viewing by at least one authorized entity.

2. The system of claim 1 wherein the at least one sensor is an entry point sensor for detecting an event that is an unauthorized entry to the premises at an entry point where the entry point sensor is located, while the system is activated.

3. The system of claim 1 wherein the at least one sensor is a motion sensor for detecting an event that is an unauthorized movement through the premises in an area where the motion sensor is located, while the system is activated.

4. The system of claim 1 wherein the at least one sensor is a beam detector for detecting an event that is an unauthorized movement through the premises in a passageway where the beam detector is located, while the system is activated.

5. The system of claim 1 wherein the at least one sensor is an audio detector for detecting an event that is an unauthorized sound in the premises while the system is activated.

6. The system of claim 1 wherein the at least one sensor is a broken glass detector for detecting an event that is a broken window in the premises at a window where the broken glass detector is located, while the system is activated.

7. The system of claim 1 wherein the at least one sensor is a maintenance detector for detecting an event that is a premises maintenance malfunction in the premises while the system is activated.

8. The system of claim 7 where the maintenance detector is a temperature sensor for determining that the temperature within the premises has moved outside a specified range.

9. The system of claim 1 wherein the at least one sensor is an emergency event detector for detecting an emergency event that is a fire in the premises while the system is activated.

10. The system of claim 1 wherein the at least one sensor is an emergency event detector for detecting an emergency event that is smoke in the premises while the system is activated.

11. The system of claim 1 wherein the event data is a video image.

12. The system of claim 1 wherein the event data is an audio record.

13. The system of claim 1 wherein each at least one sensor has a unique identification code associated therewith that is transmitted to the website with the event data for the purpose of identifying the particular sensor that has detected an event, and permitting an authorized accessing entity to determine: a) a type of event that has occurred; b) a particular sensor detecting the event; and c) an imaging device providing the imaged data to the web site for review.

14. The system of claim 1 wherein an authorized entity is one of: a) a central monitor; b) a property owner; c) police personnel; d) fire personnel; or e) emergency medical personnel.

15. The system of claim 11 wherein the at least one imaging device is a video camera.

16. The system of claim 15 further comprising a lamp that is coupled to the controller and that is activated while the video camera is operating to enable the video camera to record the event if it is dark or there is low light.

17. The system of claim 12 wherein the at least one imaging device is a microphone.

18. The system of claim 1 wherein the at least one imaging device is a still camera.

19. The system of claim 15 further comprising a video recorder for storing video images captured by the video camera for the purpose of allowing review of the event after it has occurred.

20. The system of claim 1 wherein the website is accessed by the at least one authorized entity to communicate with the system controller for remotely instructing the system controller to perform functions.

21. The system of claim 20 wherein the functions are one of activating the system, deactivating the system, reviewing past events occurring on the system, accessing maintenance information, activating the imaging device, or deactivating the imaging device.

22. The system of claim 1 wherein at least two or more entities access the website simultaneously.

23. The system of claim 22 wherein the two entities simultaneously accessing the website communicate with each other to determine a course of action for handling the event.

24. The system of claim 1 wherein the event data viewed by the at least one authorized entity is a live image.

25. A method of detecting an event in a premises and transmitting data regarding the event, comprising:

detecting the event using at least one sensor;

receiving a signal at a controller from the at least one sensor indicating that an event has been detected;

capturing event data associated with the event detected at a particular at least one sensor using a particular imaging device coupled to the controller and located proximate to the at least one sensor wherein the imaging device is activated by the controller upon receiving the signal from the particular sensor;

transmitting the event data captured by the imaging device using a transmitter coupled to the controller and the imaging device upon receiving a transmission activation signal from the controller after detection of the event; and receiving the event data at a website from the transmitter and making the event data accessible for viewing by at least one authorized entity.

26. The method of claim 25 wherein the event data viewed by the at least one authorized entity is a live image.

27. The method of claim 25 wherein the website is accessed by the at least one authorized entity to enable communication with the system controller and remotely instructing the system controller to perform functions.

28. The method of claim 25 wherein at least two or more entities access the website simultaneously.

* * * * *